(12) United States Patent
Varga

(10) Patent No.: US 8,332,322 B2
(45) Date of Patent: Dec. 11, 2012

(54) METHOD OF ESTABLISHING IDENTITY VALIDATION BASED ON AN INDIVIDUAL'S ABILITY TO ACCESS MULTIPLE SECURE ACCOUNTS

(75) Inventor: James Frank Varga, Musselburgh (GB)

(73) Assignee: miiCard Limited, Edinburgh (GB)

( * ) Notice: Subject to any disclaimer, the term of this patent is extended or adjusted under 35 U.S.C. 154(b) by 132 days.

(21) Appl. No.: 12/775,657

(22) Filed: May 7, 2010

(65) Prior Publication Data

US 2011/0276485 A1    Nov. 10, 2011

(51) Int. Cl.
*G06Q 40/00* (2006.01)
(52) U.S. Cl. ............................................ 705/44; 705/30
(58) Field of Classification Search ............... 705/10–44
See application file for complete search history.

(56) References Cited

U.S. PATENT DOCUMENTS

| | | | |
|---|---|---|---|
| 5,193,114 A * | 3/1993 | Moseley | 713/183 |
| 5,578,808 A * | 11/1996 | Taylor | 235/380 |
| 6,363,351 B1 * | 3/2002 | Moro | 705/5 |
| 6,606,606 B2 * | 8/2003 | Starr | 705/36 R |
| 6,978,369 B2 * | 12/2005 | Wheeler et al. | 713/170 |
| 7,080,037 B2 * | 7/2006 | Burger et al. | 705/50 |
| 7,127,606 B2 * | 10/2006 | Wheeler et al. | 713/156 |
| 7,308,426 B1 * | 12/2007 | Pitroda | 705/35 |
| 7,558,407 B2 * | 7/2009 | Hoffman et al. | 382/115 |
| 7,835,960 B2 * | 11/2010 | Breck et al. | 705/35 |
| 7,860,784 B2 * | 12/2010 | Bedier | 705/38 |
| 7,890,422 B1 * | 2/2011 | Hirka et al. | 705/39 |
| 7,930,760 B2 * | 4/2011 | Coles et al. | 726/27 |
| 7,992,780 B2 * | 8/2011 | Larsen | 235/380 |

* cited by examiner

*Primary Examiner* — Frantzy Poinvil
(74) *Attorney, Agent, or Firm* — Greenberg Traurig LLP

(57) ABSTRACT

A system and methods that enables and utilizes the conversion of an individual's ability to access multiple secure accounts to establish and validate the individual's digital primary identity. The control for the digital primary identity validation is user-centric so that the individual controls the amount of information supplied and therefore the level of assurance achievable. The level of assurance can be added to the digital primary identity. An identity card for digital primary identity validation can be used online or in-person. Validation and level of assurance is reviewed regularly or continuously. Levels of assurance can be increased by validating primary sources of identification.

35 Claims, 5 Drawing Sheets

METHOD OF ESTABLISHING IDENTITY VALIDATION BASED ON AN INDIVIDUAL'S ABILITY TO ACCESS MULTIPLE SECURE ACCOUNTS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of identity validation, and in particular to systems and methods that utilize an individual's ability to access multiple secure accounts to establish and validate the individual's digital primary identity.

BACKGROUND OF THE INVENTION

Keeping identity information secure is of significant importance not only to individuals, but also to businesses with which they interact and to organizations that deal with identity theft and misuse such as money laundering and fraud. The validation of a person's identity is particularly important when the individual is not physically present, as is the case for online transactions.

Validation relates to the confirmation or establishment of the truthfulness/soundness of an identity claim in order to have the claim sanctioned. Various forms of primary identification are generally utilized for validation purposes, such as traditionally physical forms of identification which relate to physical attributes of an individual, including passport photographs, biometrics and DNA information. An example of current primary identity validation is a bank requesting that an individual come in person to a branch and present a passport which is checked to confirm it is a genuine document and the photo matches the individual. Primary identity validation is contrasted with secondary identity validation, which traditionally relies on facts associated with an individual and relates to assessing the suitability of an individual to engage in a transaction. The suitability may first be confirmed by determining, for example, whether an individual has a sufficient credit limit for a transaction. Then, the individual may engage in the transaction, during which process Primary identity validation may occur.

There are two fundamental aspects of establishing the validity of one's identity. First, an individual's identity must be established to exist. Second, it must be shown that the identity belongs to the individual in the transaction.

Proof of the existence of an identity is commonly achieved in real time through confirmation of identity details that are readily accessible, whether in-person or online. Such identity details may be an individual's address, date of birth, electoral roll registration, criminal record, credit rating, etc. Current identity validation solutions in the market evaluate the level of consistency between information disclosed by an individual with information on record. The more that consistency exists, the greater the level of comfort that the information supplied is correct. Organizations that offer services to confirm the existence of identity and check for consistency include databrokers, such as Experian, Equifax and CallCredit.

One problem with solely establishing the existence of an identity without linking the identity to an individual is that it does not sufficiently address the question of whether the individual who supplies the data is in fact the correct individual or an imposter who has obtained the information checked. Affiliation of an identity to an individual that is claiming ownership is often conducted offline using such pieces of primary/hardcopy identification as passports, utility bills, birth certificates, documents sent to a home address for signature, or requests to attend an office in person. Online financial companies such as PayPal and online banks also attempt to establish ownership of an identity through a process of paying in one or more small amounts of money into a bank account and requiring the purported owner of the identity to confirm the amount through an email address purported to be associated with the identity.

U.S. Patent Publication No. 2008/0215346, which is assigned to Neteller, describes a predetermined level of assurance which establishes that an identity is affiliated with a user by contacting a number of databrokers and requesting verification of at least one piece of secondary identifying information associated with the predetermined level. If primary identification is required, the validation step is performed offline. As used by Neteller, the term financial information is understood to be details such as an account number and sort code, rather than the ability to access the financial information through a password and username (i.e. confirmation/checking of data items instead of secure access capability). Such information may be checked, but this is done through databrokers. UC Group Limited also aggregates secondary identification information from multiple brokers and uses a similar definition of financial information.

Validation is often used for only one financial transaction at a time. For example, price comparison websites are required to check identification details for each quote, taking up time and costing money for each quoting institution. Online identity solutions such as NetIDMe, and verification token software such as Microsoft's Geneva/Infocards and OpenID, are commonly used to provide online identities that associate a username and password with a token verified by a third party. Financial passporting that checks only a single account's details through the transfer of money is also common.

Due to the increase in Internet retail, credit card and bank details are handed over to more and more third parties. Personal information about a transacting party may already be known or easily discoverable from a significant number of sources. Such attainable information may include birth dates, addresses, mother's maiden names, or primary school attended. As a consequence, the security of financial and personal information is greatly compromised.

Certain aspects of an individual's online identity which are more protected include usernames and passwords that are used to access important accounts such as financial accounts (bank accounts and trading accounts), government accounts (related to tax submission and voting), and work or educational accounts (firm logins, university logins, professional logins including those used for medical professionals who access patient details).

SUMMARY OF THE INVENTION

A method of validation of a digital primary identity as authorized by a trusted third party is disclosed. The method of authorization utilizes aggregation of the ability to access one or more secure accounts, which may be online accounts or offline accounts. The ability to access secure accounts is transformed or converted into a mechanism to validate an identity that is potentially complementary to and more secure than existing methods of identification validation. The control of digital primary identity validation is user-centric, and the individual user may control the amount of information supplied and therefore the level of assurance achievable.

In an embodiment, the invention provides a method for converting the ability to access multiple secure accounts to the establishment of a validated digital primary identity. An entity's access rights for one or more secure accounts are registered with the system. The multiple secure accounts are accessible by the entity, which may be an individual. Account security information is received by the system for registering the access rights for the secure accounts. The access rights for the multiple secure accounts are registered. In the registration process, the account security information is validated against records stored by providers of the multiple secure accounts. Instances of confirmed access rights for the multiple secure accounts are aggregated, and a validated digital primary identity based on the aggregated plurality of access rights is established. The validated digital primary identity is at least as valid as was proven for at least one of the plurality of access rights for the multiple secure accounts. The validated digital primary identity is associated with the entity by confirming that the validated digital primary identity belongs to the entity. The validated digital primary identity satisfies validation requirements for future transactions between the entity and third parties.

BRIEF DESCRIPTION OF THE DRAWINGS

The foregoing and other objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE EMBODIMENTS

Figure 1:
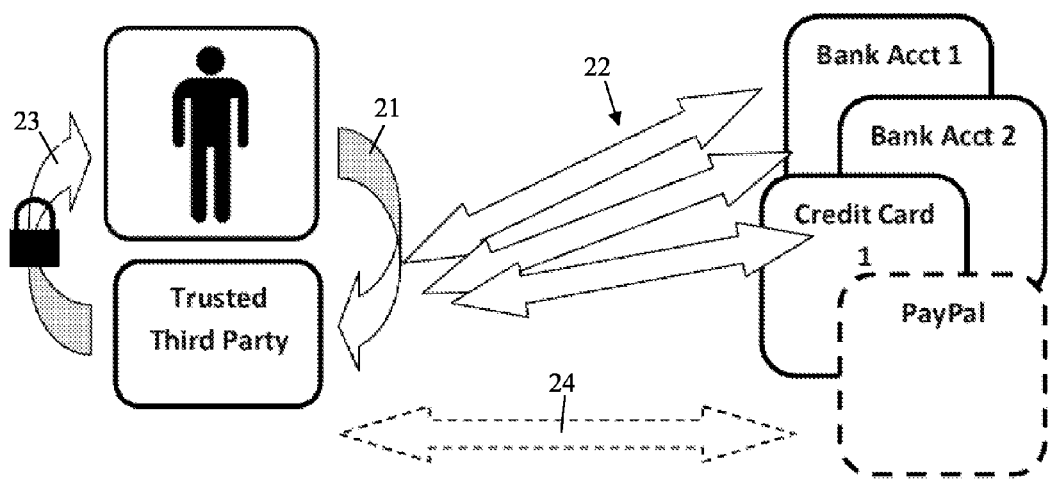
FIG. 1 shows an illustration of the method for enhanced digital primary identity validation, in accordance with certain embodiments of the invention.

Reference will now be made in detail to the embodiments of the present invention, examples of which are illustrated in the accompanying drawings.

The ability to access secure accounts that are associated with a digital primary identity across a broad spectrum of institutions can provide a level of assurance that the person who is accessing the multiple secure accounts does indeed have rightful possession and control of the identity. Instead of requiring other forms of primary source validation (e.g. a passport) to be used for any subsequent validation, the ability to access these accounts can be transformed into a means of primary source identity validation that is capable of being portable (prevalidated). Such a digital primary identity validation provides a level of assurance that is potentially higher than the conventional methods of identification validation.

Validation of an identity prior to a transaction can be performed, and this allows the validated digital primary identity to be used in real time for the transaction and other transactions that follow. There is often no need for further validation, either with a form of primary identification, such as a passport, or with a confirmation that an email address can be associated with bank account details, as in the PayPal model of validation. The digital identity can be based on a unique token that may be associated with a username and password provided to the user by a trusted third party in real time. The digital primary identity is managed by a trusted third party and can be used across all digital interactions/multiple providers, for example via a single sign-on.

A level of assurance can be added to the digital primary identity. The level of assurance can be dictated by a number of factors, including: a. the number of secure accounts that have been registered and can be shown to be accessible (for example, through a login username and password and/or security information); b. the length of time since first validated; c. the frequency/number of transactions; d. the type of account, reflecting its original identity check(s); and e. other details associated with the secure accounts, such as a user name, personal details, or financial details (such as an account balance).

Varying levels of assurance can be used in varying transactions. For example, the level of assurance required will be lower for buying your local shopping from a supermarket than the level of assurance required to purchase a mortgage online. The service provider sets the required level of assurance.

The nominated accounts accessed for the purpose of creating a validated digital primary identity can be financial accounts, matriculation accounts for universities, online tax filing accounts, other government accounts, and/or other secure accounts.

The enhanced digital primary identity validation can be transferrable and/or generic. While the validation is built on the accessibility of a set of secure accounts, it can be used to validate an identity for transactions that do not directly involve the third parties related to the set of secure accounts.

The system and method may be used to produce an identity card for digital primary identity validation that can be used online or in-person. For in-person transactions, a roaming digital primary identity may be in the form of a swipe card or token on a mobile phone. For online-transactions, the identity card may be a virtual card. The identity card may be used to access a confirmation service. Prevalidation can be used on a price comparison website to remove the necessity for identification validation needed for each provider to be compared. An established identity can be used for purposes other than financial transactions, such as online voting, verifying the identification for individuals who wish to engage with a regulated service provider. An identity can also be combined with other identification validation services such as those provided by standard databrokers.

Validation and level of assurance is reviewed regularly or continuously. Prompts can be given (e.g. via text, email or online) for the individual to provide more information in order to increase the level of an assurance rating on a digital primary identity validation for use in transactions that require higher levels of assurance. Levels of assurance can be increased by validating primary sources of identification. For example, a passport can be taken into a location (e.g. a local post office) and through a computer or a swipe card device the certificate can be augmented with the information that the passport has been validated as a primary source. In addition, token certification can be associated to a specific machine, such as a home computer or mobile phone.

Figure 2:
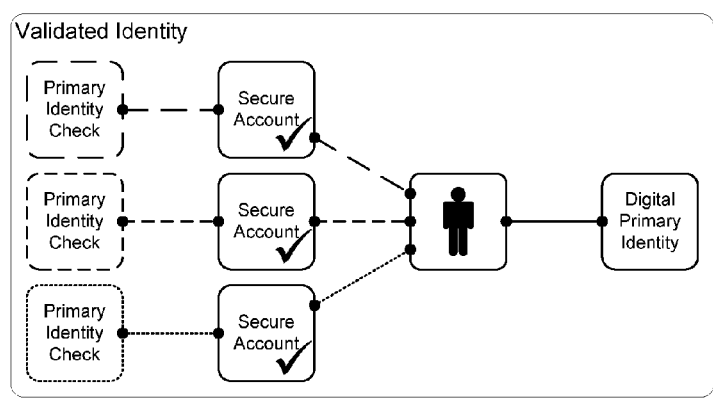
FIG. 2 shows separate traditional primary identity checks happening as part of the creation of each secure account subsequently being transformed into a single digital primary identity.

As illustrated in FIG. 1, the disclosed system and method includes a validated secure digital primary identity/passport which individually identifies the user, in real time, with a high level of assurance in support of the digital primary identity. Login details of selected accounts are provided via a secure transfer 21 with a trusted third party. As the third party confirms account access with the institutions that correspond to the selected accounts, a certified token for an identity is provided in line with the identity's accessibility, as shown in step 22. An enhanced digital primary identity is established 23 with a username and password linked/managed with a digital passport or card. The level of assurance is increased by adding 24 another account. FIG. 2 illustrates a scenario wherein separate Primary ID checks happened as part of creation of each Secure Account, with different secure access "paths" for each Account subsequently being transformed by the present system and method into a single Digital Primary Identity.

This unique digital primary identity validation technique utilizes existing digital identification management applications, such as Microsoft's Geneva software and CardSpace, and account aggregation services, such as the service provided by Yodlee. The presently disclosed digital primary identity validation method can work in conjunction with other methods of secondary identity validation, such as the services provided by databrokers, such as Equifax and Experian. The present system can equally be used as a stand-alone primary validation technique.

Multiple benefits are provided to organizations and individuals, particularly when any offline continuity breaks are circumvented. Such a user-centric approach benefits consumers with a single sign-on, a reduction in the risk of identity theft, the convenience of faster and smoother transaction completions, and potential incentives offered by service providers for their participation. In addition, businesses are benefited with an online, real-time, anti-money laundering (AML) compliant process, a reduction in the risk of fraud, an improved online transaction conversion rate, reduced costs versus the costs associated with seeking offline identity validation, a single customer view for group portfolio scenarios, and improved customer satisfaction levels.

Figure 3:
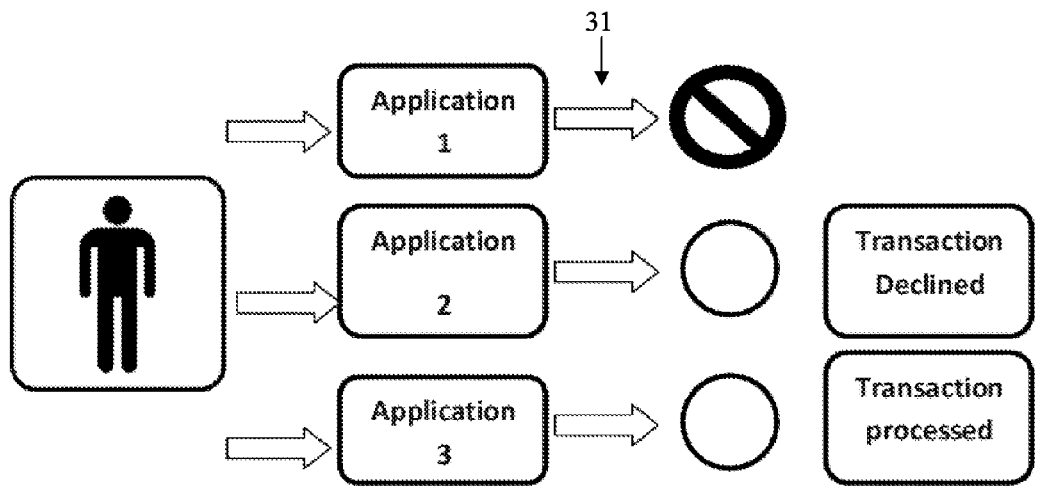
FIG. 3 shows an illustration of identification prevalidation performed individually for different applications on a price comparison website.
Figure 4:
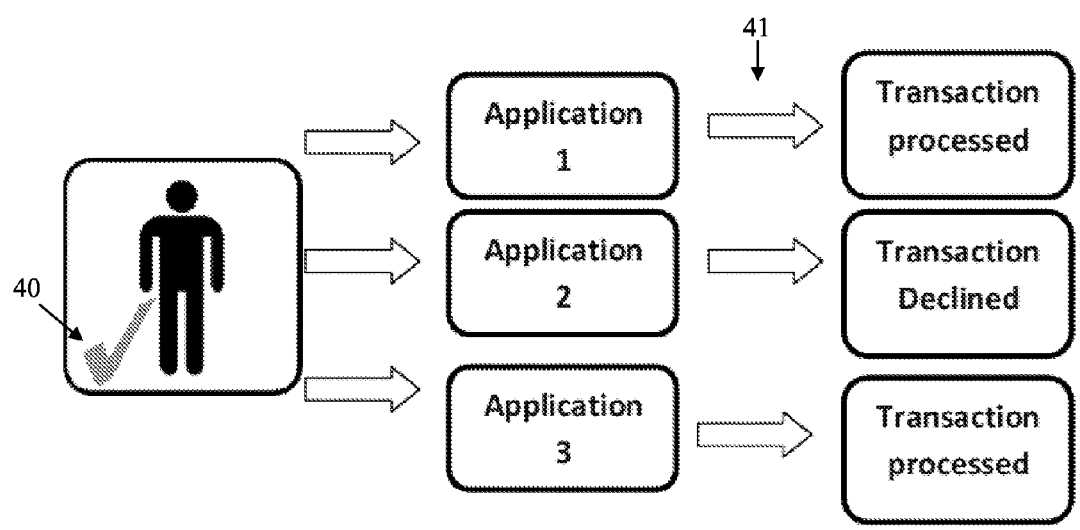
FIG. 4 shows an illustration of the utilization of prevalidation in determining whether transactions are processed or declined, in accordance with certain embodiments of the invention.

Prevalidation allows, for example, a price comparison website to pass on the level of assurance to each supplier/site. As a result, cost and time are significantly reduced. As shown in FIG. 3, significant costs and time are incurred when each identification validation for several applications are individually performed 31. Prevalidation allows savings in time and cost, as depicted in FIG. 4. In the process shown in FIG. 4, validation 40 has occurred prior to the Applications 1, 2 and 3. The likelihood that an identity qualifies for the transactions (i.e., the level of validity is judged sufficient by a service provider for the parties to attempt to transact) is determined in a comparing step 41 which compares the levels of assurance for each transaction with the level of assurance for the pre-validated digital primary identity.

An enhanced digital primary identity card can store a level of assurance regarding the unique and correct identity of the card-holder by establishing aggregated evidence of access and activity on an individual's nominated financial product portfolio and by utilizing, for example, Microsoft's Infocard technology. The identity card reflects a level of composite trust in the validity of an individual's identification.

In an embodiment, a user must choose to register for an identity card and is solely responsible for determining what information will be provided for attaining the desired level of assurance at any point in time. Only the desired information will be disclosed to a third party, by way of the secure, digital primary identity. The user controls when and how the card is used. The identity card is accessed via a secure sign on/password system. Multiple cards can be supported per individual with varying levels of assurance, if required. In this way, the user can choose to use the best match card for the transaction. By providing the opportunity to pre-validate their identification and gain a level of assurance, the identity card reduces the level of human interface per online transaction, reducing the need to pass on sensitive information to third parties. The card offers the user the opportunity to select their chosen card (according to level of assurance) to be used for any particular transaction. Hence, the user experience is consistent.

Figure 5:
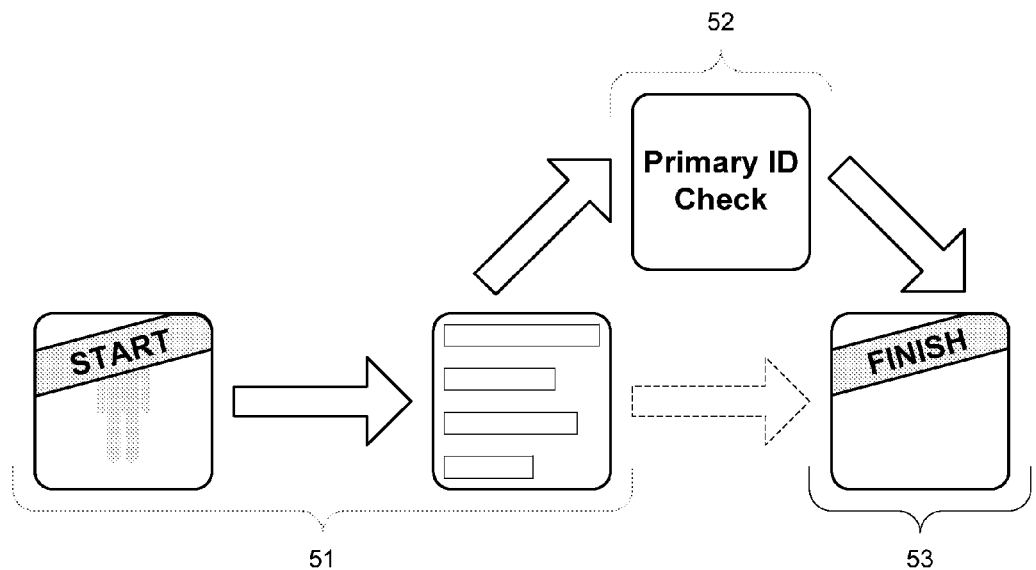
FIG. 5 shows an example of existing online transactions.

FIG. 5 depicts the user and corporate experience of an example of an existing online transaction. A user starts an online transaction process 51. A primary identification check is performed through a physical/offline identity verification 52. Such a process is combined with secondary checks 53 that are conducted as part of normal business risk management.

Figure 6:
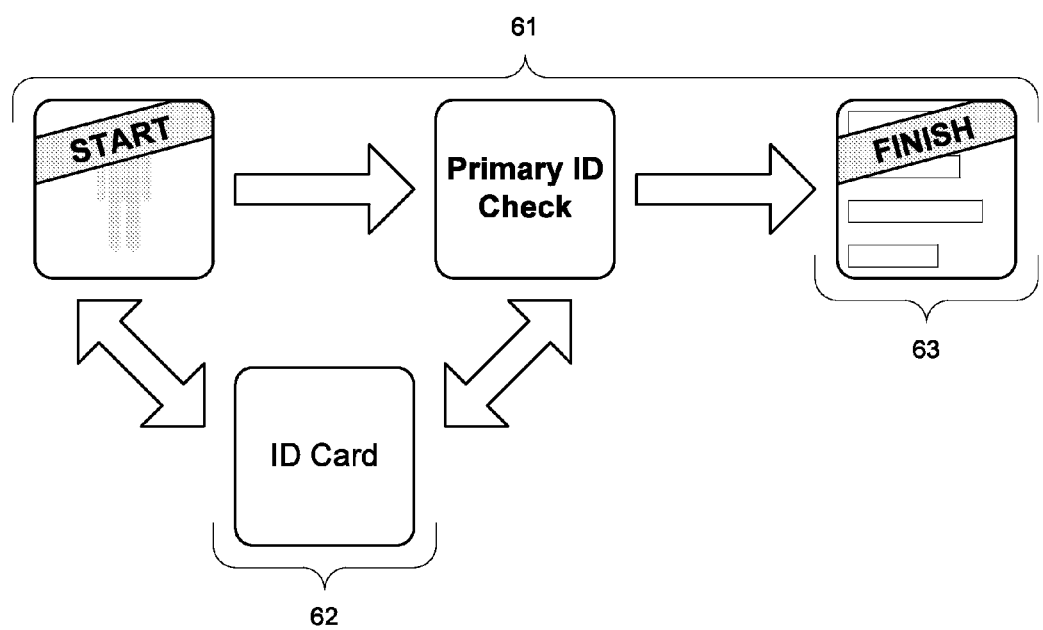
FIG. 6 shows an example of the method for online transactions, in accordance with certain embodiments of the invention.

FIG. 6 shows an embodiment of the presently disclosed invention wherein a primary identification check 61 is performed in support of pure online real-time transactions. A digital identity card leveraging the offline primary identification already performed by multiple third parties is validated by a trusted third party in real time 62. Secondary checks 63 are also conducted as part of normal business risk management.

Figure 7:
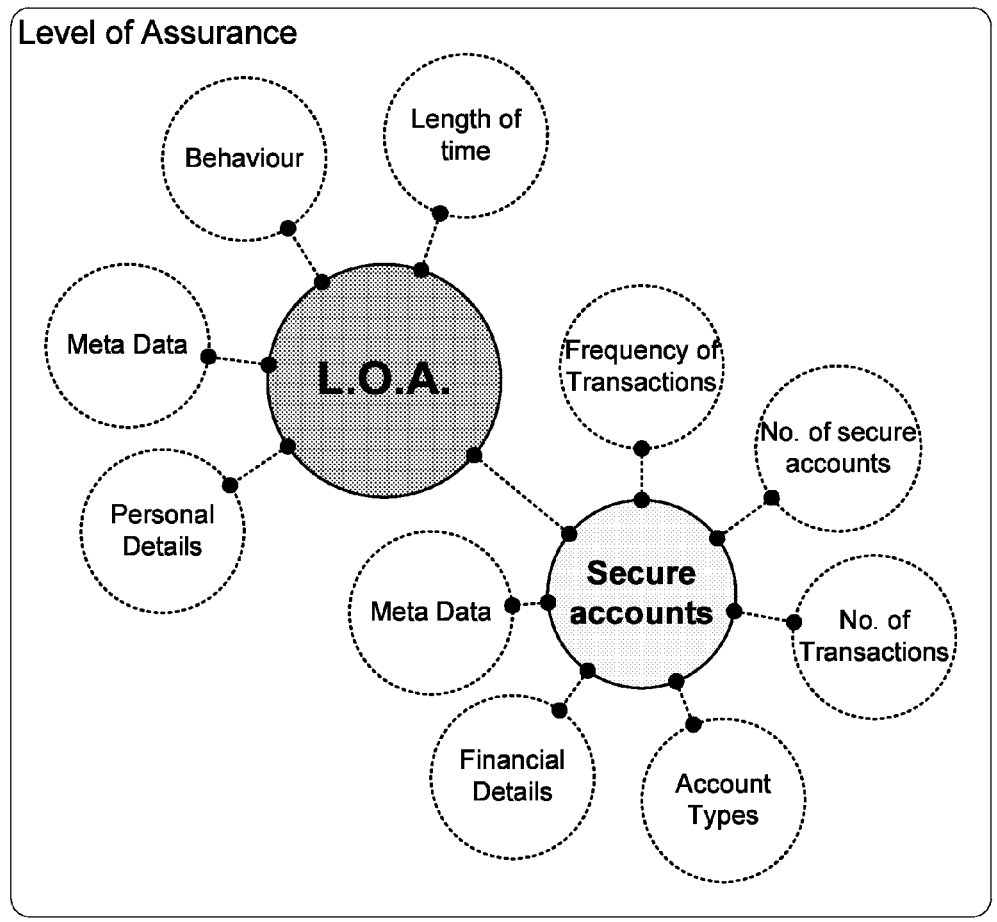
FIG. 7 shows an example of the influencing factors for establishment of a level of assurance, in accordance with certain embodiments of the invention.

An embodiment of the influencing factors related to the determination of a level of assurance associated with a digital primary identity is illustrated in FIG. 7. These influencing factors may relate directly to the individual that established the digital primary identity or each separate secure account associated with the digital primary identity.

LOA factors include elements which will be utilized in order to build a LOA profile. Weighting influences give a relative positioning to the specific items. The factors include, but are not limited to, the following: the number of accounts, the type of accounts, time (e.g. length of time account held since first aggregated), behavior of account (throughput, number of transactions, etc), account providers, and the name of the individual.

Examples of assumptions/weighting influences include, but are not limited to, the following: second or subsequent current accounts earn a lower LOA weighting than the first (all else being equal); an account with regular, cyclical inputs and regular, cyclical outputs and additional, user-initiated activity, earns higher than an account without the latter; net throughput of £10,000 on a regular basis will score higher than one of £1,000; if an originating account was opened online, it will score lower than one opened via traditional methods; account accessed over a longer period of time via an identity card will score higher than one newly added; having a net throughput of, or approaching, zero for a credit card account will score higher than a current account; regular deposits of £10,000 per month will score more highly than regular deposits of £1,000; an account with regular, cyclical deposits and additional deposits will score more highly than one without the additional deposits; an investment account which is accessed periodically will score higher than a simple savings account.

In an embodiment, samples of securely accessed accounts include but are not limited to the following: mortgage; credit card; current account; investment account; online tax submission; student matriculation account; and utility provider account.

Figure 8:
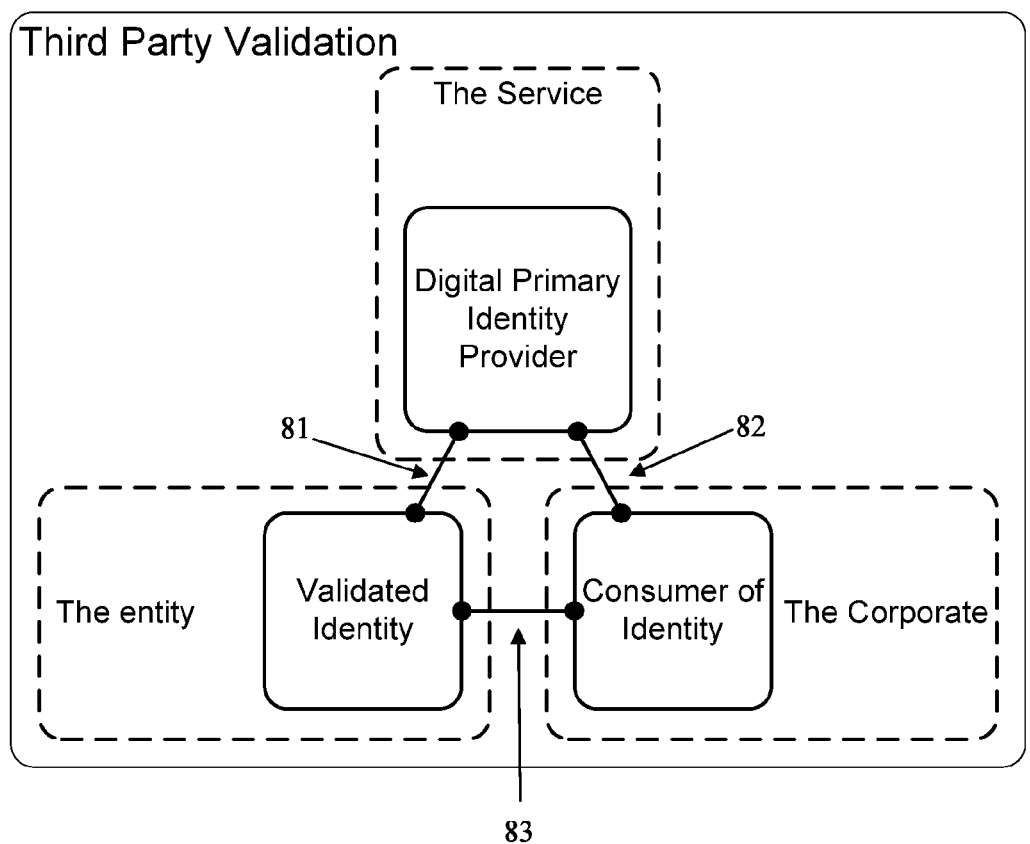
FIG. 8 shows an example of the association of a validated digital primary identity with an entity, via a third party validation service, in accordance with certain embodiments of the invention.

As shown in FIG. 8, an embodiment of a validation triangle for an individual entity ("The Entity") represents the relationships between: an individual's identity being validated 81 by a trusted third party ("The Service"), the trusted third party passing 82 the validation information to a second third party ("The Corporate"), and the individual and second third party engaging in an interaction supported by the validation information 83.

The present invention has been described above with reference to block diagrams and operational illustrations of methods and devices that utilize an individual's ability to access multiple secure accounts to establish and validate the individual's digital primary identity. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While the invention has been particularly shown and described with reference to embodiments thereof, it will be understood by those skilled in the art that various changes in form and details may be made therein without departing from the spirit and scope of the invention.

What is claimed is:

1. A method for transforming an ability to access multiple secure accounts into a validated digital primary source identity, comprising the steps of:
   utilizing a computerized system comprising one or more computers each having a processor to register a plurality of access rights for multiple secure accounts, wherein the multiple secure accounts are accessible by an entity, the entity being an individual, wherein account security information is received for registering the access rights to the secure accounts;
   utilizing said computerized system to verify each of the plurality of access rights for the multiple secure accounts, wherein the account security information is validated against records stored by the providers of the multiple secure accounts;
   utilizing said computerized system to aggregate the plurality of access rights for the multiple secure accounts;
   utilizing said computerized system to establish a validated digital primary source identity based on the aggregated plurality of access rights, wherein the validated digital primary source identity is at least as valid as at least one of the identities validated as a precursor to one of the plurality of access rights for the multiple secure accounts being established; and,
   utilizing said computerized system to associate the validated digital primary source identity with the entity,
   wherein the validated digital primary source identity satisfies validation requirements for future transactions between the entity and third parties;
   whereby control of the identity of the entity is retained by the entity.

2. The method of claim 1, further comprising the step of confirming that the validated identity belongs to the entity.

3. The method of claim 1, wherein said validated digital primary source identity comprises a prevalidated identity for use in a future transaction.

4. The method of claim 1, wherein said secure accounts comprise online accounts.

5. The method of claim 1, further comprising:
   managing the validated digital primary source identity, wherein a level of assurance is determined based on at least one assurance factor.

6. The method of claim 5, wherein the at least one assurance factor is selected from a group consisting of: the number of the registered access rights for the multiple secure accounts; the length of time since establishing the validated digital primary source identity; the number of transactions involving the validated digital primary source identity; the frequency of the transactions; the account types of the multiple secure accounts; financial details associated with the secure accounts; or personal details such as name.

7. The method of claim 1, wherein the validated digital primary source identity is stored as a unique token.

8. The method of claim 7, wherein the unique token is stored on an identity card, the identity card being usable online or in-person.

9. The method of claim 8, wherein the identity card storing the token is a virtual identity card.

10. The method of claim 8, wherein the identity card is an information card.

11. The method of claim 8, wherein the identity card is a smart card.

12. The method of claim 7, wherein the unique token is stored in a mobile phone.

13. The method of claim 7, wherein the unique token is stored in a computer.

14. The method of claim 7, wherein the unique token is stored in a smart card.

15. The method of claim 7, wherein the unique token is associated with a single sign-on device based on credentials.

16. The method of claim 1, further comprising:
   setting a required level of assurance for a transaction, wherein the level of assurance varies based on a plurality of factors.

17. The method of claim 16, wherein said plurality of factors include the value of the transaction.

18. The method of claim 1, wherein the third parties are the providers of the multiple secure accounts.

19. The method of claim 1, wherein the third parties are entities other than the providers of the multiple secure accounts.

20. The method of claim 1, further comprising regularly reviewing validation of the validated digital primary source identity.

21. The method of claim 5, further comprising reviewing the level of assurance based on the at least one assurance factor.

22. The method of claim 5, further comprising a step of recalculating the level of assurance based on aggregation of the plurality of access rights.

23. The method of claim 1, further comprising:
receiving account security information for an additional secure account; and
verifying access rights for the additional secure account, wherein the account security information is validated against records stored by a provider of the additional secure account.

24. The method of claim 1, further comprising:
prompting the entity for account security information in response to a requested transaction that requires a higher level of assurance.

25. The method of claim 1, further comprising:
receiving additional account security information;
verifying the additional account security information; and
adjusting a level of assurance rating of the validated digital primary source identity.

26. The method of claim 25, wherein the additional information comprises account security information.

27. The method of claim 25, wherein the additional information comprises an approval from a government authority.

28. The method of claim 27, wherein the approval comprises a post office verification of an identity card.

29. The method of claim 27, wherein the approval comprises an augmentation of an identity card using a computer or swipe card device.

30. The method of claim 1, further comprising:
determining the likelihood of the validated digital primary source identity qualifying for a plurality of future transactions based on levels of assurance; and
providing the determination via a product comparison website.

31. A non-transitory computer readable medium for converting the ability to access multiple secure accounts to establish a validated digital primary source identity, comprising data that, when accessed by a machine, cause the machine to perform operations comprising:
registering a plurality of access rights for multiple secure accounts, wherein the multiple secure accounts are accessible by an entity, wherein the entity is an individual, wherein account security information is received for registering the plurality of access rights for the multiple secure accounts;
verifying each of the plurality of access rights for the multiple secure accounts, wherein the account security information is validated against records stored by providers of the multiple secure accounts;
aggregating the plurality of access rights for the multiple secure accounts;
establishing a validated digital primary source identity based on the aggregated plurality of access rights, wherein the validated digital primary identity is at least as valid as at least one of the plurality of access rights for the multiple secure accounts;
associating the validated digital primary identity with the entity; and
wherein the validated digital primary identity satisfies validation requirements for future transactions between the entity and third parties;
whereby control of the identity of the entity is retained by the entity.

32. A validated digital primary source identity system, comprising:
a processor for executing program code and memory combined with the processor for storing the program code;
a user interface for registering a plurality of access rights for multiple secure accounts, wherein the multiple secure accounts are accessible by an entity, wherein the entity is a individual, wherein account security information is received for registering the plurality of access rights for the multiple secure accounts;
a verification module to validate the account security information against records stored by operating organizations of the multiple secure accounts;
an identity module that tracks and aggregates the plurality of access rights for the multiple secure accounts and establishes a validated digital primary source identity based on the aggregated plurality of access rights, wherein the validated digital primary source identity is at least as valid as at least one of the plurality of access rights for the multiple secure accounts;
computer storage that associates the validated digital primary source identity with the entity;
whereby control of the identity of the entity is retained by the entity.

33. The identity system according to claim 32, wherein the computer storage comprises an ownership database.

34. The identity system according to claim 32, wherein the validated digital primary source identity satisfies validation requirements for future transactions between the entity and third parties.

35. The identity system according to claim 32, wherein the system operates in real time or near real time to confirm the identity of the entity during a transaction.

* * * * *